(12) United States Patent
Kramer et al.

(10) Patent No.: US 6,546,014 B1
(45) Date of Patent: Apr. 8, 2003

(54) METHOD AND SYSTEM FOR DYNAMIC BANDWIDTH ALLOCATION IN AN OPTICAL ACCESS NETWORK

(75) Inventors: Glen Kramer, Davis, CA (US); Gerry Pesavento, Davis, CA (US)

(73) Assignee: Alloptic, Inc., Livermore, CA (US)

( * ) Notice: Subject to any disclaimer, the term of this patent is extended or adjusted under 35 U.S.C. 154(b) by 85 days.

(21) Appl. No.: 09/759,539

(22) Filed: Jan. 12, 2001

(51) Int. Cl.[7] .............................................. H04L 12/56
(52) U.S. Cl. .................................. 370/395.41; 370/449
(58) Field of Search ......................... 370/395.4, 395.41, 370/395.42, 395.43, 422, 426, 438, 439, 447, 448, 461, 462, 449, 450, 451, 452, 453, 455, 458, 230

(56) References Cited

U.S. PATENT DOCUMENTS

| | | | |
|---|---|---|---|
| 5,623,668 A | | 4/1997 | Nieuwenhuizen |
| 5,648,958 A | * | 7/1997 | Counterman ................. 370/437 |
| 5,794,117 A | | 8/1998 | Benard |
| 5,917,822 A | * | 6/1999 | Lyles et al. ............... 370/395.4 |
| 5,978,374 A | | 11/1999 | Ghaibeh et al. |
| 6,088,360 A | * | 7/2000 | Amaral et al. ........... 348/385.1 |
| 2001/0030785 A1 | * | 10/2001 | Pangrac et al. ............. 359/125 |
| 2001/0038620 A1 | * | 11/2001 | Stanwood et al. .......... 370/336 |

OTHER PUBLICATIONS

Alan Quayle, Broadband Passive Optical Network Media Access Control Protocols, SPIE Proceedings vol. 2919, 1996, pp. 268–278.

* cited by examiner

*Primary Examiner*—Kwang Bin Yao
(74) *Attorney, Agent, or Firm*—Wilson & Ham; Thomas Ham

(57) ABSTRACT

An optical access network and method for transmitting optical data in the network utilizes an interleaved polling scheme to efficiently use the available bandwidth of the network. The use of the interleaved polling scheme allows a central terminal of the network to dynamically allocate upstream bandwidth from remote terminals of the network to the central terminal in response to the amount of data that is waiting at the remote terminals to be transmitted to the OLT. In one embodiment, the optical access network is based on Passive Optical Network (PON) technology. In another embodiment, the optical access network utilizes Ethernet protocol to encapsulate data in Ethernet frames for transmission. Thus, in these embodiments, the optical access network includes all of the advantages associated with the PON technology and/or the Ethernet protocol. In addition, since the allocation of upstream bandwidth is on an as needed basis, loss of bandwidth due to unfilled time slots is substantially eliminated.

43 Claims, 12 Drawing Sheets

METHOD AND SYSTEM FOR DYNAMIC BANDWIDTH ALLOCATION IN AN OPTICAL ACCESS NETWORK

FIELD OF THE INVENTION

The invention relates generally to access networks, and more particularly to a passive optical access network.

BACKGROUND OF THE INVENTION

The explosion of the Internet and the desire to provide multiple communications and entertainment services to end users have created a need for a broadband network architecture that improves access to end users. Although the bandwidth of backbone networks has experienced a substantial growth in recent years, the bandwidth provided by access networks has remained relatively unchanged. Thus, the "last mile" still remains a bottleneck between a high capacity LAN or Home network and the backbone network infrastructure.

Digital Subscriber Line (DSL) and Cable Modem (CM) technologies offer some improvements over more conventional last mile solutions. However, these technologies still do not provide enough bandwidth to support emerging services such as Video-On-Demand (VoD) or two-way video conferencing. In addition, not all customers can be covered by DSL and CM technologies due to distance limitations.

One broadband access network architecture that offers a solution to the "last mile" problem is a point-to-multipoint passive optical network (PON). A point-to-multipoint PON is an optical access network architecture that facilitates broadband communications between an optical line terminal (OLT) and multiple remote optical network units (ONUs) over a purely passive optical distribution network. A point-to-multipoint PON utilizes passive fiber optic splitters and combiners to passively distribute optical signals between the OLT and the remote ONUs.

FIGS. 1A and 1B illustrate the management of network traffic in a point-to-multipoint PON. As an example, the PON is shown to include an OLT 102 and three ONUs 104, 106 and 108, although the PON may include additional ONUs. Referring to FIG. 1A, the OLT includes an optical transmitter 110 that sends downstream traffic containing ONU-specific information blocks 1, 2 and 3 to the ONUs. The downstream traffic is optically broadcasted by a passive optical splitter/combiner 112 into three separate signals that each carries all of the ONU-specific information blocks. The ONUs 104, 106 and 108 include optical receivers 114, 116 and 118, respectively, that receive all the information blocks transmitted by the OLT. Each ONU then processes the information blocks that are intended for that ONU and discards the information blocks that are intended for the other ONUs. For example, ONU-1 receives information blocks 1, 2, and 3. However, ONU-1 only delivers information block 1 to end user 1. Likewise, ONU-2 only delivers information block 2 to end user 2 and ONU-3 only delivers information block 3 to end user 3.

Referring to FIG. 1B, the ONUs 104, 106 and 108 also include optical transmitters 120, 122 and 124, respectively, to transmit upstream traffic to OLT 102. The upstream traffic is managed utilizing a time division multiplex access (TDMA) protocol, in which specific transmission time slots are dedicated to individual ONUs. The ONU-specific time slots are synchronized so that upstream information blocks from the ONUs do not interfere with each other once the information blocks are combined onto the common fiber. For example, ONU-1 transmits information block 1 in a first ONU-specific time slot, ONU-2 transmits information block 2 in a second ONU-specific time slot, and ONU-3 transmits information block 3 in a third ONU-specific time slot. The time division multiplexed upstream traffic is then received by an optical receiver 126 of the OLT.

A concern with a TDMA PON is that the bandwidth of the PON is not always efficiently utilized for data transmission because network traffic typically exhibits a high degree of burstiness. The bursty network traffic results in some transmission time slots that consistently overflow even under a very light traffic load. In addition, the bursty network traffic results in some transmission time slots that are not completely filled even when the overall traffic load is very high.

In view of the above concern, there is a need for an access network based on PON technology that efficiently utilizes the available bandwidth by reducing the amount of bandwidth wasted because transmission time slots are not filled to the maximum capacity.

SUMMARY OF THE INVENTION

An optical access network and method for transmitting optical data in the network utilizes an interleaved polling scheme to efficiently use the available bandwidth of the network. The use of the interleaved polling scheme allows a central terminal of the network to dynamically allocate upstream bandwidth from remote terminals of the network to the central terminal in response to the amount of data that is waiting at the remote terminals to be transmitted to the OLT. In one embodiment, the optical access network is based on Passive Optical Network (PON) technology. In another embodiment, the optical access network utilizes Ethernet protocol to encapsulate data in Ethernet frames for transmission. Thus, in these embodiments the optical access network includes all of the advantages associated with the PON technology and/or the Ethernet protocol. In addition, since the allocation of upstream bandwidth is on an as needed basis, loss of bandwidth due to unfilled time slots is substantially eliminated.

A method of transmitting optical data in an optical network in accordance with the invention includes the steps of generating a table that includes information about the current sizes of data waiting to be transmitted from a plurality of remote terminals to a central terminal, selectively transmitting grant messages to the remote terminals, receiving authorized amounts of the data from the remote terminals and request messages containing updated information about the current sizes of the data waiting to be transmitted at the remote terminals in response to the grant messages, and updating the table using the updated information contained in the request messages received from the remote terminals. Each grant message is indicative of a permission for a targeted remote terminal to transmit an authorized amount of data waiting at the targeted remote terminal, which is dependent on the information included in the table with regard to the targeted remote terminal. In an embodiment, the optical network is a passive optical network (PON), which may be an Ethernet-based PON.

In an embodiment, the table that includes information about the current sizes of data waiting to be transmitted from the plurality of remote terminals further includes information about round trip times of data transmission between the central terminal and the remote terminals. In this embodiment, the method may include steps of computing current round trip times for the remote terminals, including monitoring transmission times associated with the grant messages from the central terminal and reception times associated with the authorized amounts of the data from the remote terminals, and updating the information about round trip times of data transmission using the computed current round trip times.

In an embodiment, the step of updating the table includes subtracting a value from a new entry for the targeted remote terminal. The value corresponds to the actual amount of data transmitted from said targeted remote terminal, while the new entry corresponds to the updated information contained in a request message from the targeted remote terminal.

In an embodiment, the method may further include a step of scheduling transmission times for the grant messages such that the data and the updated information from the remote terminals do not overlap during transmission. The transmission times for the grant messages substantially define receptions times for the request messages at the central terminal. The step of scheduling transmission times may include rescheduling an original transmission time for a grant message to a rescheduled transmission time when the original transmission time conflicts with anther transmission time for a different grant message.

In an embodiment, the method further includes steps of detecting a disconnected remote terminal, and reducing the frequency of grant messages that are transmitted to the disconnected remote terminal. The step of detecting a disconnected remote terminal may include waiting a predefined period for the disconnected remote terminal to respond to a grant message transmitted to the disconnected remote terminal.

An optical access network in accordance with the invention includes a plurality of remote terminals and a central terminal. In one embodiment, the optical access network is an Ethernet-based PON. The remote terminals of the network receive and transmit optical data. Each remote terminal is configured to transmit a request message and an authorized amount of data waiting at the remote terminal in response to a grant message received by the remote terminal. The request message includes updated information about the current size of data waiting at the remote terminal, while the grant message includes information that indicates the authorized amount. The central terminal of the network is optically coupled to the remote terminals to transmit and receive the optical data.

The central terminal includes memory that has a table containing latest information about the current sizes of data waiting to be transmitted from the remote terminals to the central terminal, and a processor that is configured to selectively transmit grant messages to the remote terminals using the latest information contained in the table to indicate authorized amounts of data that can be sent by receiving remote terminals. The processor of the central terminal is further configured to receive request messages from the remote terminals in response to the grant messages and to update the table in memory using the updated information contained in the request messages.

In an embodiment, the processor of the central terminal is configured to update the table in memory by subtracting values from new entries for selected remote terminals that have transmitted the request messages to the central terminal. The values correspond to the actual amounts of data transmitted from the selected remote terminals, while the new entries correspond to the updated information contained in the request messages.

In an embodiment, the processor of the central terminal is further configured to schedule transmission times for the grant messages such that the data and the request messages from the remote terminals do not overlap during transmission. In this embodiment, the processor may be further configured to reschedule an original transmission time for a specific grant message to a rescheduled transmission time when the original transmission time conflicts with another transmission time for a different grant message.

In an embodiment, the processor of the central terminal is configured to detect disconnected remote terminals by identifying the remote terminals that have not responded to the grant messages within a timeout period. In this embodiment, the processor may be configured to reduce the frequency of grant messages that are transmitted to the disconnected remote terminals.

In an embodiment, the table in memory further includes information about round trip times of data transmission between the central terminal and the remote terminals. In this embodiment, the processor of the central terminal may be configured to compute current round trip times for the remote terminals by monitoring transmission times associated with grant messages from the central terminal and reception times associated with request messages from the remote terminals and to update the information about round trip times using the current round trip times.

Other aspects and advantages of the present invention will become apparent from the following detailed description, taken in conjunction with the accompanying drawings, illustrated by way of example of the principles of the invention.

DETAILED DESCRIPTION OF THE INVENTION

Figure 1A:
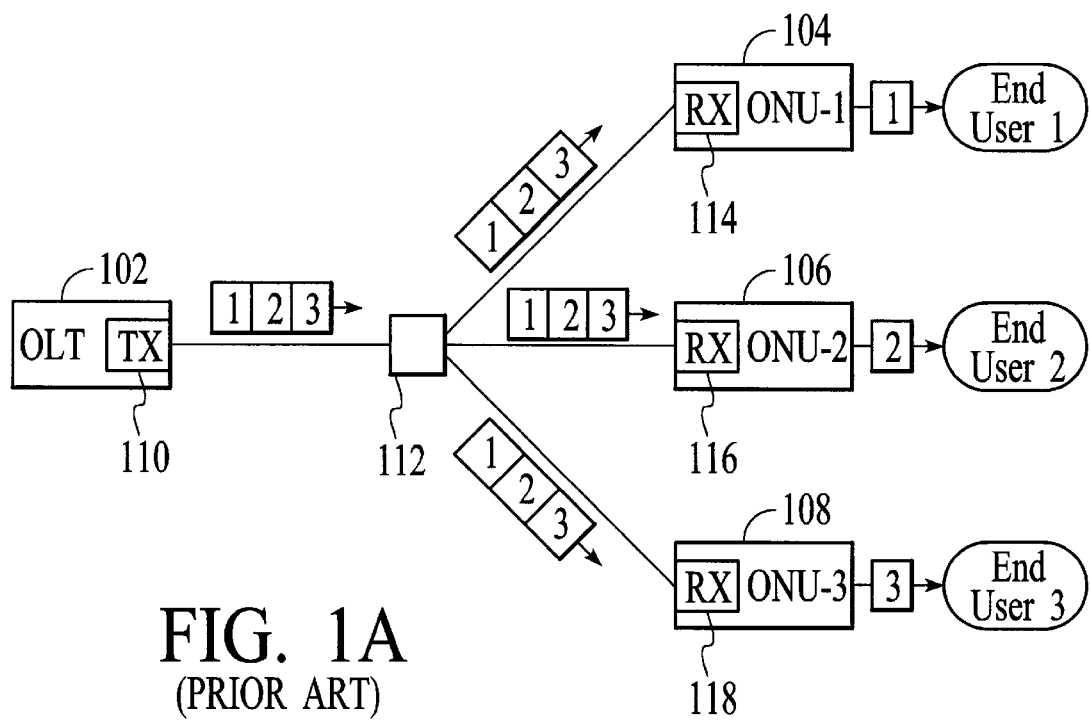
FIG. 1A illustrates the downstream flow of traffic from an OLT to multiple ONUs in a point-to-multipoint PON.
Figure 1B:
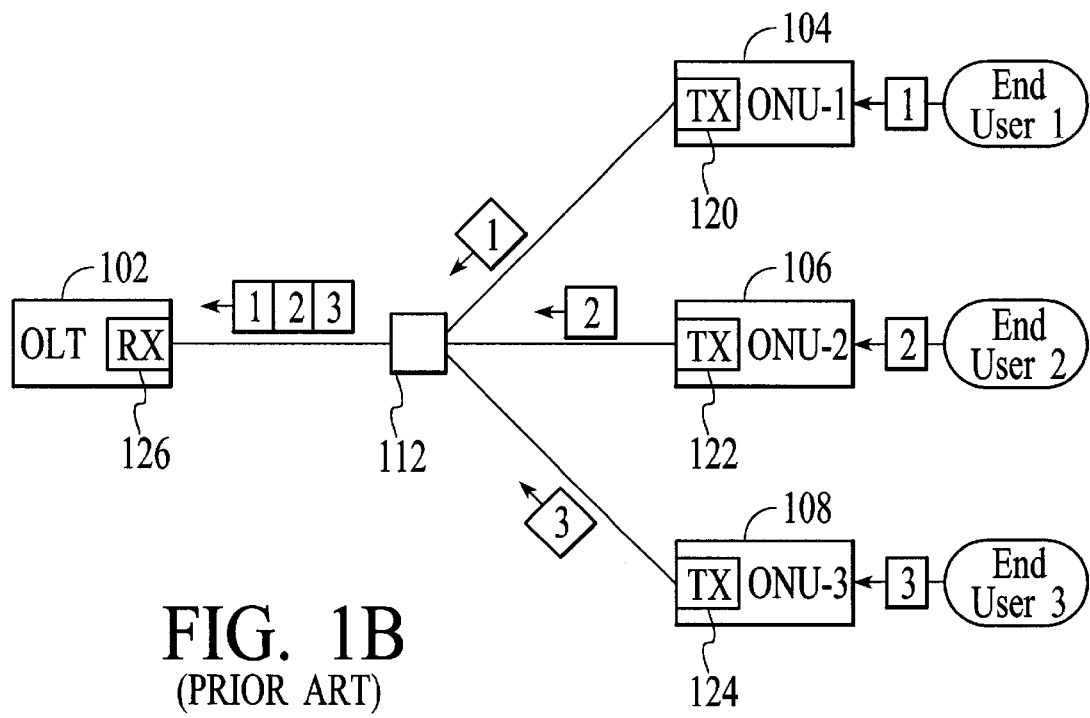
FIG. 1B illustrates the upstream flow of traffic from the ONUs to the OLT in the point-to-multipoint PON.
Figure 2:
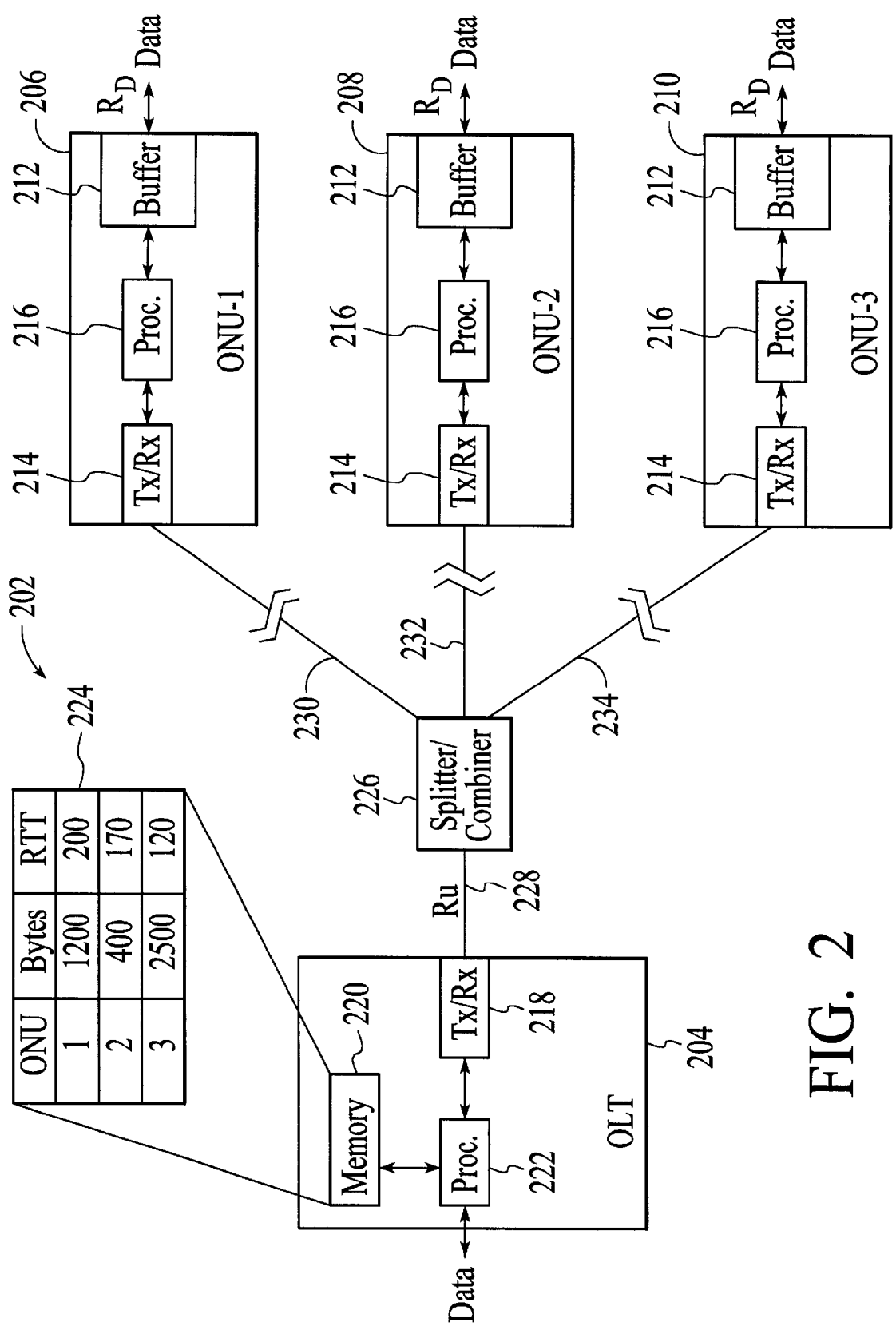
FIG. 2 is a block diagram of an optical access network based on PON technology in accordance with the present invention.

With reference to FIG. 2, an optical access network 202 that utilizes an interleaved polling scheme in accordance to the present invention is shown. The optical access network is based on Passive Optical Network (PON) technology. Therefore, the optical access network embodies the advantages associated with a PON. Furthermore, the interleaved polling scheme of the optical access network efficiently utilizes the available bandwidth of the network by allocating bandwidth on an as needed basis.

In an exemplary embodiment, the optical access network 202 utilizes the IEEE 802.3 protocol (commonly referred to as Ethernet) to encapsulate data in Ethernet frames for transmission. Although the optical access network 202 may utilize other protocols, such as ATM data link protocol, the use of Ethernet protocol is preferred. Currently, about ninety-five percent (95%) of LANs use the Ethernet protocol. Therefore, an Ethernet-based PON is much more preferable than an ATM-based PON to interconnect Ethernet networks. In addition, ATM imposes a cell tax on variable length IP packets, since an IP packet that is longer than 48 bytes must be transmitted in two or more ATM cells. As the number of ATM cells increase, the bandwidth consumed by header information increases accordingly. Furthermore, ATM equipment is more expensive than Ethernet equipment.

The optical access network 202 includes an optical line terminal (OLT) 204, which can be considered as a central terminal of the network, and a plurality of optical network units (ONUs) 206, 208 and 210, which can be considered as remote terminals of the network. For illustrative purposes, the optical access network is described as including only three ONUs, although the network may include additional ONUs. Furthermore, although the optical access network is shown as being configured in a tree topology, the optical access network may be configured in other network topologies, such as a ring topology or a bus topology. The topology of the optical access network is not critical to the invention.

Each ONU 206, 208 or 210 of the optical access network 202 includes a buffer 212, an optical transceiver 214 and an ONU processor 216. Each buffer of the ONUs operates as a temporary storage medium to store bytes of data that are to be transmitted to the OLT 204. The bytes of data stored in the buffer include data from end users (not shown) supported by the respective ONU. Each optical transceiver of the ONUs operates to transmit some or all of the bytes of data stored in the buffer as Ethernet frames in the form of optical signals to the OLT. In addition, each optical transceiver operates to receive optical signals from the OLT. Each ONU processor of the ONUs performs various operations to ensure that the respective ONU is properly functioning. Furthermore, each ONU processor executes steps in accordance with the interleaved polling scheme of the optical access network, which is described in detail below.

The OLT 204 of the optical access network 202 includes an optical transceiver 218, an OLT memory 220 and an OLT processor 222. The optical transceiver of the OLT is similar to the optical transceivers 214 of the ONUs 206, 208 and 210. The OLT optical transceiver operates to transmit optical signals to the ONUs, and to receive optical signals from the ONUs. The OLT memory 220 stores a polling table 224 to facilitate the interleaved polling scheme of the optical network access. The OLT memory may be any type of storage medium, such as DRAM or FPGA. Although the OLT memory is shown in FIG. 2 as a separate component from the OLT processor, the OLT memory may instead be incorporated in the OLT processor. The polling table is illustrated as having exemplary data for a particular instant. The polling table includes information regarding the ONUs supported by the OLT. This ONU information is illustrated in the, column of the polling table under the heading "ONU". The polling table also includes information about the number of bytes of data buffered at each of the ONUs waiting to be transmitted to the OLT. The buffered data information is illustrated in the column of the polling table under the heading "Bytes". Furthermore, the polling table includes information about the round-trip times (RTTs) for data to travel between the OLT and the ONUs. The RTT information is illustrated in the column of the polling table under the heading "RTT". An RTT value included in the polling table includes the actual RTT as well as processing times required to process and generate control messages. The polling table stored in the memory of the OLT is used by the OLT processor to efficiently regulate the network traffic between the OLT and the ONUs using the interleaved polling scheme.

The optical access network 202 also includes at least one optical splitter/combiner 226 and optical fibers 228, 230, 232 and 234 that provide connections between the OLT 204 and the ONUs 206, 208 and 210 through the optical splitter/combiner. The optical fiber 228 connects the OLT to the optical splitter/combiner. The optical fibers 230, 232 and 234 connect the optical splitter combiner to the ONUs 206, 208 and 210, respectively. The optical fibers 228, 230, 232 and 234 may be used for both downstream (OLT to ONUs) and upstream (ONUs to OLT) data transmissions. In an alternative configuration, these optical fibers may be used for only one-way data transmissions. In such a configuration, the optical access network includes dual optical fibers to allow two-way data transmissions.

The operation of the optical access network 202 with respect to downstream traffic management is similar to the operation of a traditional Ethernet network, which by design broadcast data throughout the Ethernet network. In the downstream direction, optical Ethernet frames are broadcast by the OLT 204 and then extracted by their destination ONU based on the media-access control (MAC) addresses of the frames. Therefore, in the downstream direction, there is no issue of competing bandwidth usages since the OLT is the only data-transmitting source. Consequently, the total available bandwidth is almost fully utilized in the downstream. However, in the upstream direction, ONUs must share the channel capacity of the optical fiber 228 and other resources. The upstream bandwidth of the optical access network is clearly limited as the sum of peak ingress rates $R_D$ of all ONUs 206, 208 and 210 exceeds the PON throughput $R_U$, or the upstream channel capacity. Furthermore, since network traffic typically exhibits a high degree of burstiness, a time-division multiple access (TDMA) system with fixed time slots cannot fully utilize the upstream bandwidth. In TDMA systems, the bursty network traffic results in some transmission time slots that consistently overflow even under a very light traffic load. In addition, the bursty traffic results in some transmission time slots that are not completely filled even when the overall traffic load is very high.

In contrast to the TDMA systems with fixed time slots, the optical access network 202 maximizes the upstream bandwidth utilization by using an interleaved polling scheme to manage upstream traffic. The polling scheme of the optical access network is described with reference to FIGS. 3–8 using specific values as examples, such as the byte sizes of data in buffers of the ONUs and the RTT values for each ONU.

Figure 3:
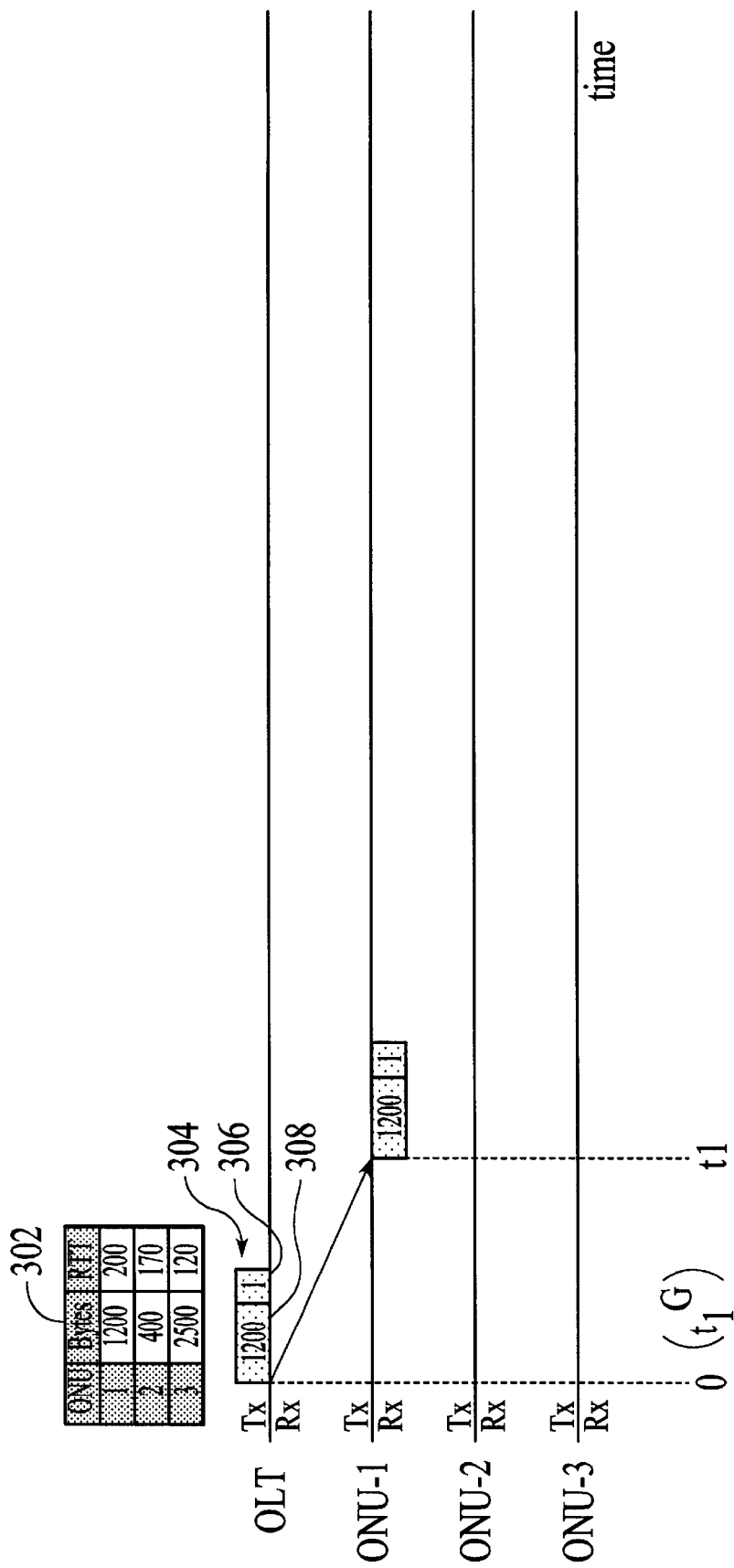
FIGS. 3–8 illustrate the polling scheme of the optical access network.

For a given moment of time (t=0) after the initialization of the OLT 204, a polling table 302 stored in the memory 220 of the OLT is assumed to be current, as illustrated in FIG. 3. That is, the polling table includes updated information about the active ONUs, the number of bytes waiting at each ONU's buffer, and the round-trip time (RTT) for each ONU. At t=0, the current polling table includes the following information. For the ONU-1, there are 1200 bytes of data waiting in the buffer 212 and the RTT is 200 $\mu$s. For the ONU-2, there are 400 bytes of data waiting in the buffer 212 and the RTT is 170 $\mu$s. For the ONU-3, there are 2500 bytes of data waiting in the buffer 212 and the RTT is 120 $\mu$s.

As illustrated in FIG. 3, at time t=0, the OLT 204 transmits an ONU control message 304 to the ONU-1, which authorizes the ONU-1 to send 1200 bytes of data that is currently in the buffer 212 of the ONU-1. Such a message will be referred to herein as a GRANT message. Since the OLT broadcasts data to all ONUs in the downstream direction, a GRANT message contains identification of so the destination ONU in a NID ("node identification") field 306, as well as the size of the granted window in bytes in a WS ("window size") field 308, as illustrated by the GRANT message 304. The GRANT message 304 is then received by the ONU-1, at time t=t1. The time t1 is approximately half of the RTT for the ONU-1. By the time the GRANT message is received by the ONU-1, additional bytes of data may have been received by the buffer of the ONU-1. As an example, the ONU-1 may have received an additional 3100 bytes of data. Therefore, the total number of bytes in the buffer of the ONU-1 is 4300 (1200+3100) bytes of data.

Figure 4:
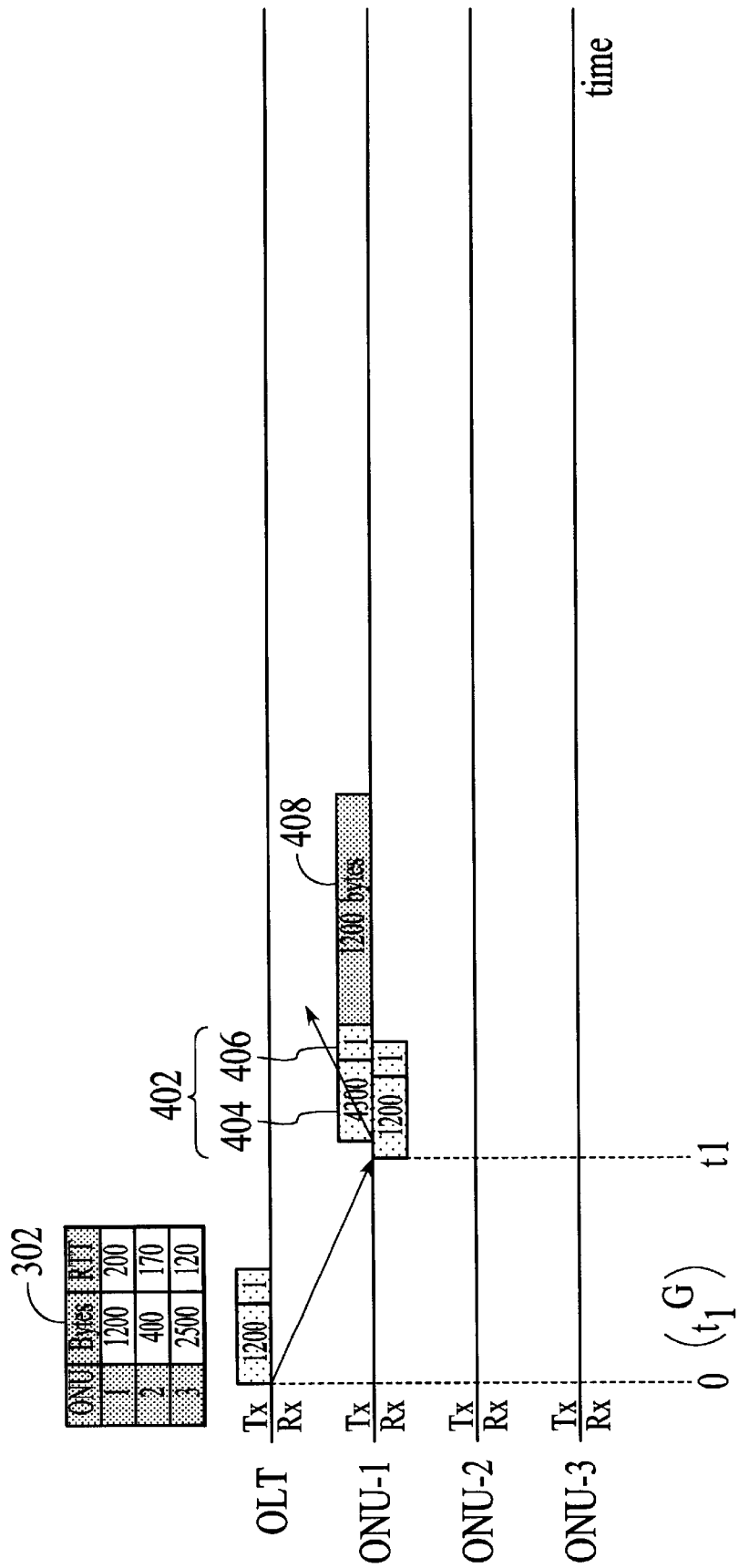

Upon receiving the GRANT message 304, the ONU-1 sends an OLT control message 402 to the OLT 204, as illustrated in FIG. 4. Such a message will be referred to herein as a REQUEST message. Similar to a GRANT message, a REQUEST message also includes an NID field 404 and a WS field 406. The WS field includes the current bytes of data waiting in the buffer of a particular ONU when the REQUEST message was generated. Thus, the REQUEST message 402 will indicate that 4300 bytes of data are currently waiting in the buffer 212 of the ONU-1. The REQUEST message tells the OLT how many bytes of data are in the buffer of the ONU-1 at the moment when the REQUEST message was generated. The ONU-1 also sends data 408 stored in the buffer of the ONU-1 up to the size of the granted window. In this example, the ONU-1 sends 1200 bytes of the data from the buffer of the ONU-1.

Even before the OLT 204 receives the REQUEST message 402 from the ONU-1, the OLT knows the time $t_1^{last}$ when the last bit of transmission from the ONU-1 will arrive at the OLT. From the RTT information in the current polling table 302, the OLT knows when the first bit from ONU-1 will arrive at the OLT. The first bit will arrive exactly after the RTT for the ONU-1. In addition, the OLT knows how many bytes (bits) will arrive at the OLT, since the OLT has authorized the ONU-1 to send a specific number of bytes by the GRANT message 304 to the ONU-1. Thus, the time $t_1^{last}$ can be derived as follows:

$$t_1^{last} = t_1^G + RTT_1 + \frac{WS_1}{\text{Line\_Rate}} =$$

$$0 + 200 \text{ μs} + \frac{1200 \text{ bytes} \times 8 \frac{\text{bits}}{\text{byte}}}{10^9 \frac{\text{bits}}{\text{sec}}} = 209.6 \text{ μs}$$

In the above equation, $t_1^G$ is the time when the GRANT message was sent to the ONU-1, $RTT_1$ is the RTT for ONU-1, $WS_1$ is the granted window size, and Line_Rate is the data transmission speed for the optical access network 202.

Figure 5:
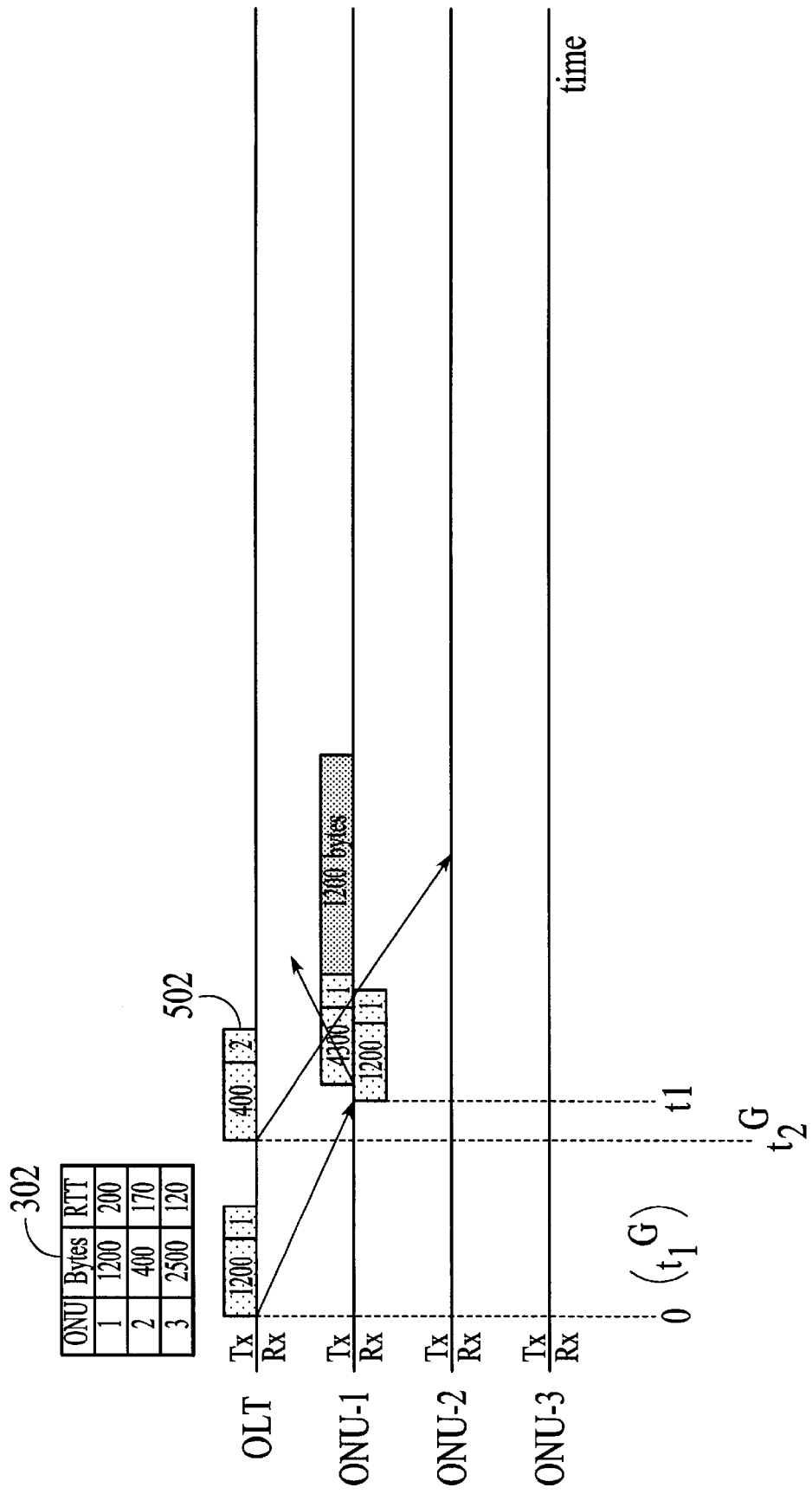

Since the OLT 204 knows when the last bit from the ONU-1 will arrive, the OLT can send a GRANT message 502 to the ONU-2 so that the first bit of transmission from the ONU-2 will arrive right after the last bit of transmission from the ONU-1, as illustrated in FIG. 5. The time $t_2^G$ for the OLT to send the GRANT message to the ONU-2 can be derived as follows:

$$t_2^G = t_1^{last} - RTT_2 + \text{Guard\_Band} = 209.6 - 170 + 5 = 44.6 \text{ μs}.$$

In the above equation, a guard band time, for example, of 5 μs, is added to ensure that data from the ONU-2 avoids collision with data from the ONU-1. In general, guard bands provide protection for fluctuations of RTTs and control message processing times of the ONUs.

Figure 6:
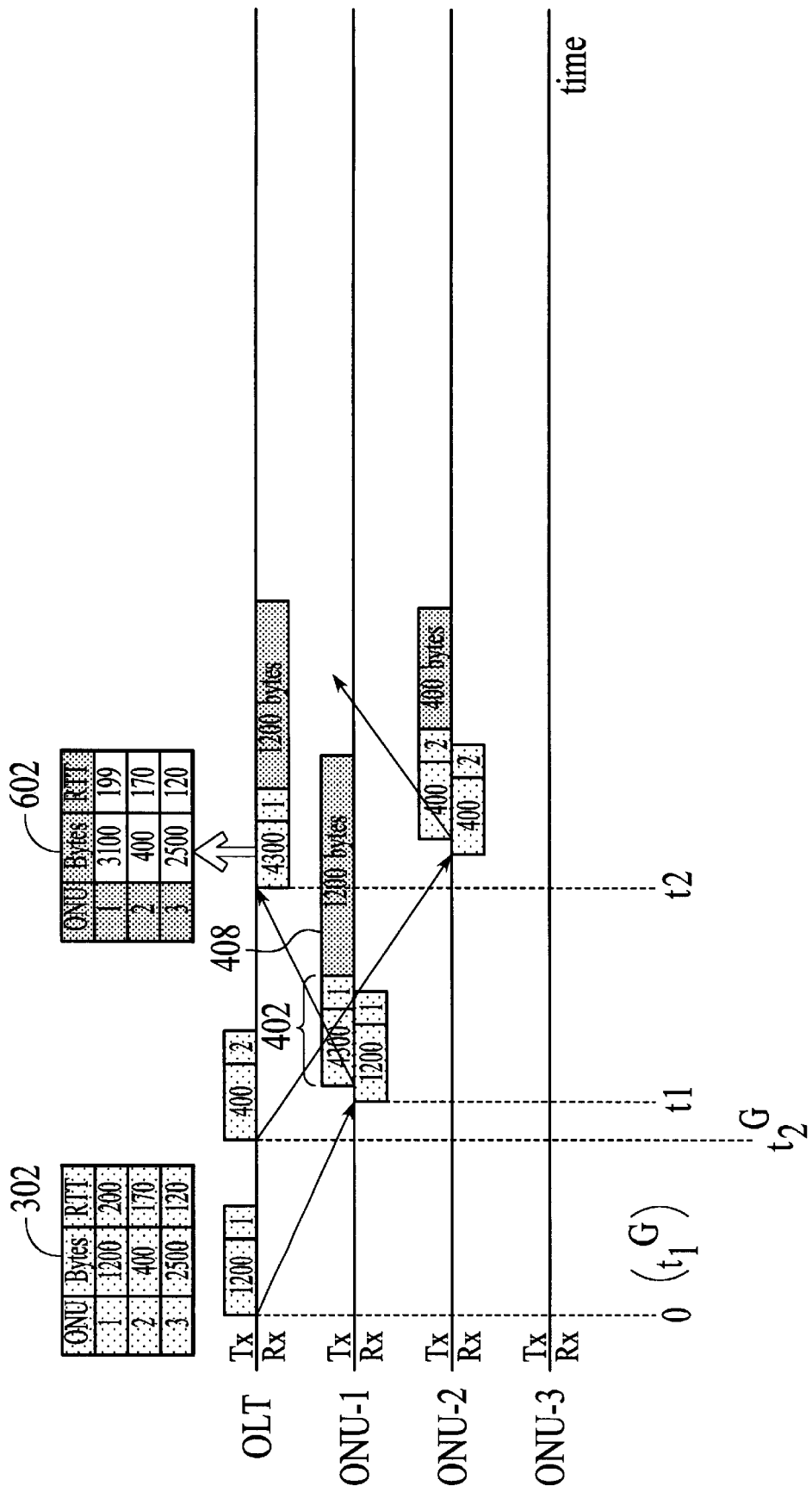
Figure 7:
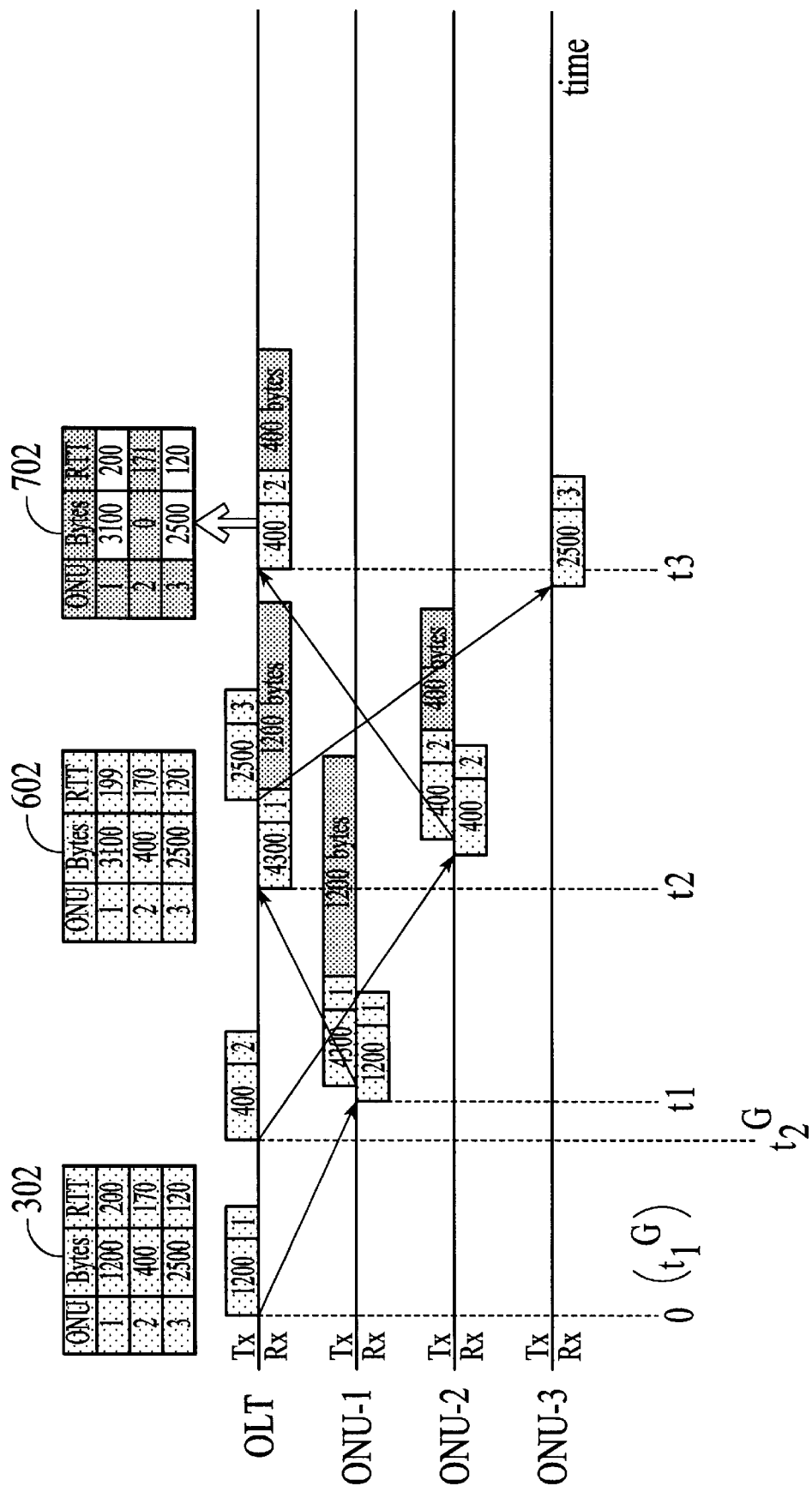

At time t=t2, the data from the ONU-1 arrives at the OLT 204 in response to the GRANT message 304 from the OLT, as illustrated in FIG. 6. The time t2 is approximately equal to the current RTT for the ONU-1. For this example, the time t2 equals 199 us. Since the REQUEST message 402 from the ONU-1 was sent first, this message is received by the OLT prior to the data 408 from the buffer 212 of the ONU-1. The information contained in the WS field of the REQUEST message 402, i.e., the number of bytes in the buffer of the ONU-1 when the REQUEST message was sent, is used by the OLT to update the polling table. The NID of the REQUEST message 402 lets the OLT know which entry of the polling table to update. Thus, in this example, the updated entry for the ONU-1 can be computed as follows:

updated_entry=new_entry−old_entry 4300−1200=3100 bytes.

Thus, the "Byte" entry for the ONU-1 is updated to 3100, as illustrated by an updated polling table 602 in FIG. 6. However, there may be situations when the granted window size is not fully filled by the data from an ONU. For example, if one or more higher-priority data packets arrive at an ONU after a Request message is sent, the ONU may send the higher-priority data packets before the other buffered data. The higher-priority data packets, which can have variable lengths, may not exactly fill the granted window size. The same problem will occur if an ONU requests a widow size greater than a maximum transmission window size, which is discussed below. If packet fragmentation is not available, then the ONU will send less data, leaving the remaining amount of data in the buffer. Updating the polling table using the above formula will result in an underestimated value for the updated_entry. An alternative approach would be for the OLT to update the table after all the data from a given ONU is received using the following formula:

updated_entry=new entry−bytes_received.

In addition to updating the current buffered data for a given ONU, the OLT keeps track of times when the GRANT messages and the corresponding REQUESTs are received. The OLT uses this information to constantly update the RTT entries for the respective ONUs. For this example, the actual RTT for the ONU-1 is 199 us. Thus, the RTT entry for the ONU-1 in the polling table 302 is changed from 200 us to 199 us, as illustrated by the updated polling table 602.

Turning now to the ONU-2, the OLT 204 calculates the time when the last bit from the ONU-2 will arrive at the OLT in the same manner as described above with respect to the ONU-1. Hence, the OLT will know when to send a GRANT message to the ONU-3 so that the data from ONU-3 will arrive at the OLT shortly after the data from the ONU-2. At time t=t3, the data from the ONU-2 arrives at the OLT, as illustrate in FIG. 7. When the REQUEST message from the ONU-2 is received by the OLT, the information contained in the latest polling table 602 is updated for the ONU-2, as illustrated by an updated polling table 702. In this example, the REQUEST message from the ONU-2 indicates that the buffer of the ONU-2 is empty, since the REQUEST message reported the same number of bytes as the actual number of bytes sent to the OLT.

Figure 8:
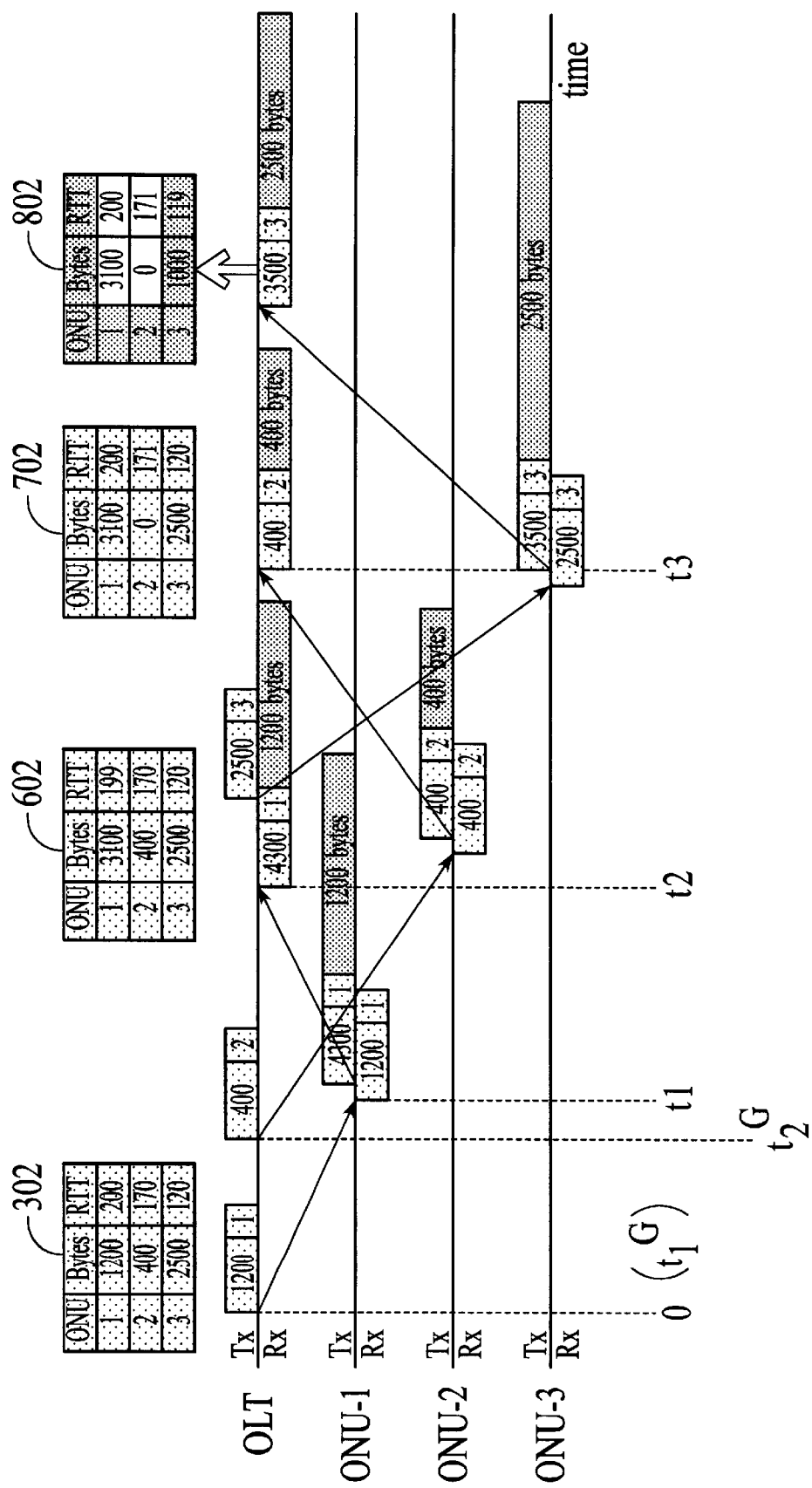

In a similar fashion, the OLT 204 calculates the time when the last bit of transmission from the ONU-3 will arrive at the OLT and sends the next GRANT message to the QNU-1, which starts the new polling cycle. Meanwhile, a REQUEST message and data from the ONU-3 are received by the OLT. The REQUEST message from the ONU-3 is used by the OLT to update the latest polling table 702 to an updated polling table 802, as illustrated in FIG. 8. When the ONU-2 is polled in the next cycle, the grant size of the GRANT message is zero bytes, since the latest "Bytes" entry for the ONU-2 is zero. In response to the GRANT message, the ONU-2 again sends a REQUEST message containing the last number of bytes waiting in the buffer of the ONU-2. However, since the grant size of the GRANT message is zero bytes, no data from the buffer of the ONU-2 is sent to the OLT. If the buffer of the ONU-2 receives additional data after the previous REQUEST message from the ONU-2 was sent, then the ONU-2 is authorized to send the additional data in the following polling cycle.

A concern with the polling scheme of the optical access network 202 is that if the OLT 204 authorizes each ONU to send the entire data stored in the buffer in one transmission, the ONUs with high data volume could monopolize the entire bandwidth. In order to avoid such monopolization, there can be a limit to the maximum transmission size for each transmission. Thus, the OLT will apply this maximum size limit when sending the GRANT messages. Consequently, every ONU will be authorized to send as many bytes of data in the buffer as requested in a previous cycle up to the maximum size limit. The maximum size limit may be fixed. As an example, the fixed maximum size limit may be based on a Service Level Agreement for each ONU. In an alternative approach, the maximum size limit may be dynamic. As an example, the dynamic maximum size limit may be based on the average network traffic load.

Figure 9:
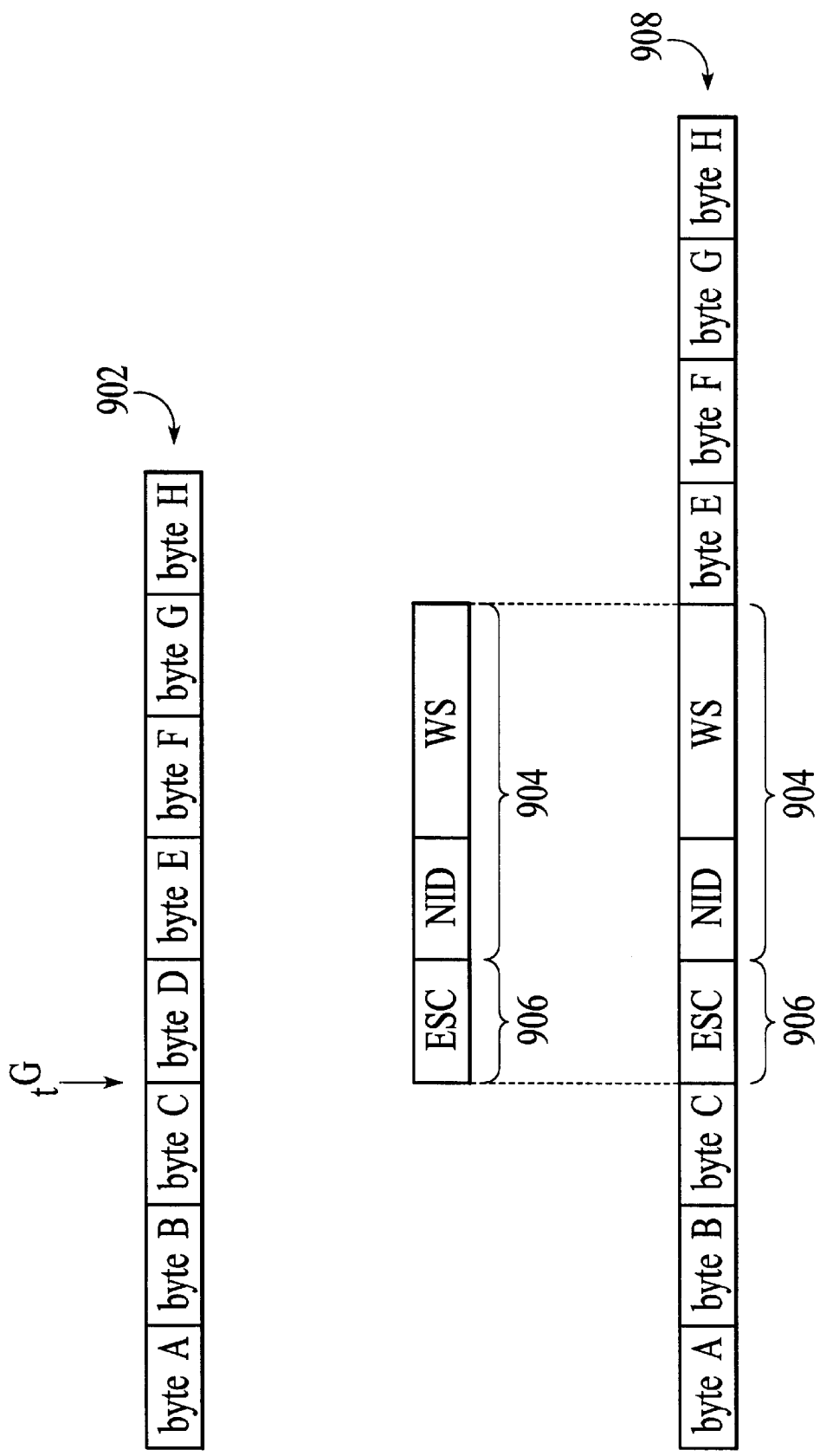
FIG. 9 illustrates the embedding of a GRANT message in an Ethernet frame by the OLT using an escape code.

In the exemplary embodiment, the GRANT and REQUEST messages are embedded between Ethernet frames or in an Ethernet frame using an escape sequence. Under the Ethernet standard IEEE 802.3, Gigabit Ethernet uses 8-to-10 bit encoding, i.e., every byte is being encoded as 10 bits before being sent over the medium. However, not all of the 10-bit values are valid encoding of an 8-bit value. One or more of these "non-valid" codes can be chosen to represent an escape code. A GRANT message or a REQUEST message can be attached to an escape code. The escape code informs the receiving unit that a GRANT or REQUEST message is present. The embedding of a GRANT message by the OLT 204 is illustrated in FIG. 9. An Ethernet frame 902 in transmission is shown in FIG. 9. The end of byte C of the Ethernet frame coincides with a transmission time $t^G$ to send a GRANT message 904. The OLT then inserts an escape code 906 and the GRANT message 904 at the end of byte C of the Ethernet frame, as shown in an embedded Ethernet frame 908. In a similar manner, a REQUEST message can be embedded between Ethernet frames or within an Ethernet frame by an ONU. The receiving unit will recognize the beginning of the control sequence by reading the escape code. The receiving unit can then extract the control message, e.g., three (3) bytes, that follow the escape code before passing the rest of the received data to a standard Ethernet receiver.

The GRANT messages transmitted by the OLT 204 are scheduled using the following formula:

$$G_j^{[i+1]} = \mathrm{MAX}\begin{cases} G_j^{[i]} + r^{[i]} - r^{[i+1]} + \dfrac{W_j^{[i]}}{R_u} + B \\ G_{j-1}^{[i+1]} + r^{[i+1]}, \end{cases} \tag{1}$$

where
$G_j^{[i]}$—time epoch when $j^{th}$ Grant to $i^{th}$ ONU is to be transmitted (note that $G_j^{[i]} + r^{[i]}$ is a time epoch when $j^{th}$ Request from $i^{th}$ ONU is received)

$r^{[i]}$—Round-Trip Time (RTT) for $i^{th}$ ONU
$W_j^{[i]}$—$j^{th}$ Window Size for $i^{th}$ ONU
$R_u$—Transmission speed (bit rate)
B—Guard Band (in µs).

In the above formula, the superscript in brackets identifies an ONU as following:

[x]=(x MOD N)+1.

The top line in the formula (1) states that the GRANT message to $[i+1]^{th}$ ONU is scheduled such that the responding REQUEST message arrives after the end of the transmission window from $i^{th}$ ONU and the guard band time. The bottom line in the formula (1) states that the GRANT message cannot be sent before the previous REQUEST message from the same ONU is received, i.e., the interval between successive GRANT messages to the same ONU is at least the RTT to that ONU. This requirement is necessary since the GRANT message needs the requested window size information contained in the previous REQUEST message.

From the formula (1), it can be seen that the GRANT message to the $[i+1]^{th}$ ONU should be sent before the GRANT message to the $i^{th}$ ONU, if the following inequality is satisfied.

$$r^{[i+1]} > r^{[i]} + \dfrac{W_j^{[i]}}{R_u} + B. \tag{2}$$

Therefore, the order of GRANT messages is generally different from the order of REQUEST messages. The REQUEST messages and the data, if any, from the ONUs arrive at the OLT in the same order in every cycle. However, since the GRANT messages are being scheduled with regard to corresponding RTTs and granted window sizes, the order of the GRANT messages may be different in every cycle.

Scheduling a GRANT message to $[i+1]^{th}$ ONU ahead of a GRANT message to $i^{th}$ ONU is not a problem, since the order of GRANT messages is determined in a cycle prior to the actual transmission of the GRANT messages. However, scheduling the GRANT messages using the formula (1) may result in a GRANT message scheduling conflict. The conflict occurs when the absolute difference between the left and right terms of the inequality (2) is less than the transmission time of the GRANT message.

Figure 10:
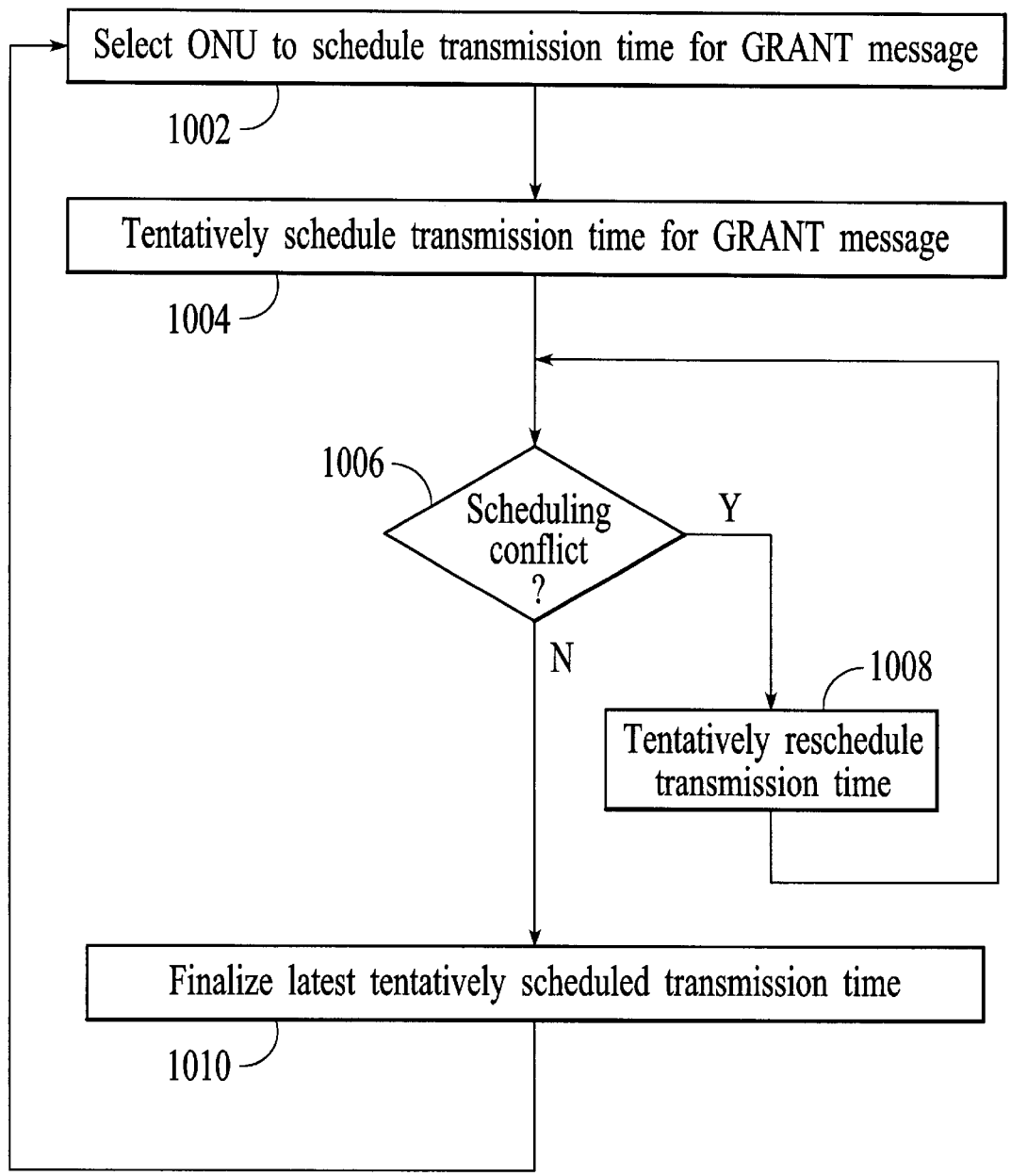
FIG. 10 is a flow diagram of an operation of the OLT with respect to GRANT message scheduling conflicts.

The OLT 204 of the optical access network 202 is configured to resolve the GRANT message scheduling conflict by rescheduling the GRANT message currently being scheduled for transmission. The operation of the OLT with respect to GRANT message scheduling conflicts is described with reference to FIG. 10. At step 1002, one of the ONUs 206, 208 and 210 is selected by the OLT to schedule a transmission time for a GRANT message. The ONU selection may be predefined by a fixed sequence or may be dynamically adjusted in accordance with prescribed network conditions. Next, at step 1004, the transmission time for the GRANT message to the selected ONU is tentatively scheduled using the formula (1). At step 1006, a determination is made whether the tentatively scheduled transmission time conflicts with an established transmission time period for a GRANT message to another ONU.

If there is a conflict, the process proceeds to step 1008, where the tentatively scheduled transmission time is delayed until after the established transmission time period for the conflicting GRANT message. That is, the GRANT message transmission time to the selected ONU is tentatively rescheduled for a time when the conflicting GRANT message will have already been sent. After the GRANT message to the selected ONU has been tentatively rescheduled, the process proceeds back to step 1006, where another determination is made whether the tentatively rescheduled transmission time conflicts with an established transmission time period for a GRANT message to a different ONU. In this fashion, the transmission time of the GRANT message to the selected ONU can be tentatively rescheduled until there is no scheduling conflict.

However, if a determination is made at step 1006 that there is no scheduling conflict, the process proceeds to step 1010, where the latest tentatively scheduled transmission time for the selected ONU is finalized as the scheduled transmission time for the GRANT message to the selected ONU. The process then proceeds back to step 1002, where the next ONU is selected to schedule a transmission time for a GRANT message to that ONU.

A consequence of using such a resolution for GRANT message scheduling conflicts is described using an example. In this example, the current GRANT message $G_j^{[h]}$ conflicts with the GRANT message $G_i^{[k]}$, which has already been scheduled. When the GRANT scheduling conflict is detected by the OLT 204, the GRANT message $G_j^{[h]}$ will get scheduled after the time when lo the end of the GRANT message $G_i^{[k]}$ is transmitted. Assuming one Gigabit per second transmission speed, as an example, the transmission time for any GRANT message is equal to 32 ns. Therefore, the GRANT message $G_j^{[h]}$ will be delayed by at most 32 ns. The fact that the GRANT message $G_j^{[h]}$ is being scheduled after the GRANT message $G_i^{[k]}$ means that the data from the ONU-h in a cycle j is suppose to arrive after the data from the ONU-k in a cycle i, i.e., either j>i or both j=i and [h]>[k]. Thus, the delay of the GRANT message $G_j^{[h]}$ will result in a corresponding increase of a guard band. This guard band increase may be further increased if the delayed GRANT message $G_j^{[h]}$ conflicts with another GRANT message. In the extreme case, the GRANT message $G_j^{[h]}$ may conflict with at most N−1 GRANT messages, where N is the number of ONUs included in the optical access network 202. For the case of N=16 and guard band time of 5 $\mu$s, the maximum acquired delay is 0.48 $\mu$s, which is less than ten percent (10%) of the guard band time. An advantage of the described scheduling conflict resolution is that the resolution does not introduce any scalability issues in terms of the value of N because an increase in the number of ONUs can only result in an increase of the guard band time.

Using the above-described polling scheme, the upstream channel of the OLT 204 is efficiently utilized to nearly one hundred percent (100%). However, some of the OLT upstream channel bandwidth is taken up by REQUEST messages that have to be embedded between data transmissions. In addition, the guard bands between the transmissions from different ONUs also take up some of the upstream channel bandwidth of the OLT. The guard bands include periods of time that are needed to readjust the sensitivity of the OLT receiver to receive optical signals from the ONUs that vary in distance from the OLT (burst mode receiving).

Figure 11:
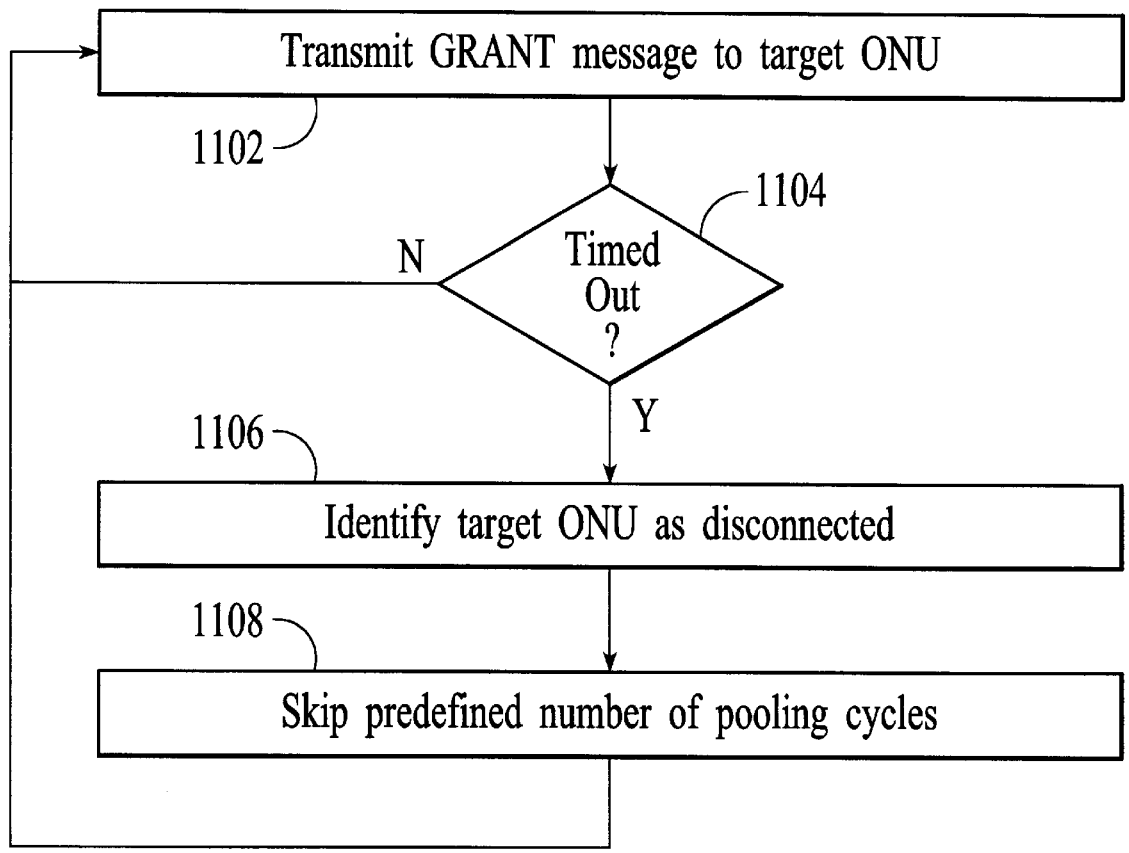
FIG. 11 is a process flow diagram of a detecting and polling procedure of the OLT with respect to disconnected ONUs.

During the operation of the optical access network 202, one or more ONUs may become disconnected due to either ONU failure or loss of power. Therefore, in one embodiment, the OLT 204 is designed to detect disconnected ONUs, and then to reduce the frequency of GRANT messages that are sent to the disconnected ONUs. The detecting and polling procedure of the OLT with respect to disconnected ONUs is described with reference to FIG. 11. At step 1102, a GRANT message is transmitted from the OLT to a target ONU. Next, at step 1104, the OLT waits for a REQUEST message from the target ONU until a timeout interval has passed. If a REQUEST message from the target ONU is received within the timeout interval, the target ONU is not disconnected and thus, the process proceeds back to step 1102, where another GRANT message is transmitted to the target ONU during the next polling cycle. However, if a REQUEST message from the target ONU is not received within the timeout interval, the target ONU is identified as being disconnected, at step 1106. Next, at step 1108, a predefined number of polling cycles are skipped for the disconnected ONU. As an example, the predefined number of polling cycles may be designed so that the disconnected ONU is only polled once per minute. The process then proceeds back to step 1102, where another GRANT message is transmitted to the target ONU to determine if the target ONU is still disconnected. As illustrated in the process flow diagram of FIG. 11, if the OLT receives a REQUEST message from an ONU previously marked as disconnected, then the ONU is then identified as active and is polled in the next polling cycle. This procedure can also be used for a cold start of the optical access network.

In this embodiment, GRANT messages are scheduled to be transmitted to the ONUs using the following formula:

$$G_j^{[i+1]} = \text{MAX} \begin{cases} G_j^{[i]} + A^{[i]} - C^{[i+1]} + \dfrac{D_j^{[i]}}{R_u} + B \\ G_{j-1}^{[i+1]} + A^{[i+1]} \end{cases} \quad (3)$$

where $$A^{[i]} = \begin{cases} \text{TIMEOUT}, & \text{if } ONU^{[i]} \text{ is disconnected} \\ r^{[i]}, & \text{otherwise} \end{cases}$$

$$C^{[i+1]} = \begin{cases} 0, & \text{if } ONU^{[i+1]} \text{ is disconnected} \\ r^{[i+1]}, & \text{otherwise} \end{cases}$$

$$D_j^{[i]} = \begin{cases} 0, & \text{if } ONU^{[i]} \text{ is disconnected} \\ W_j^{[i]}, & \text{otherwise.} \end{cases}$$

The above formula (3) is a modified version of the formula (1). For a disconnected ONU, the last known RTT value for that ONU cannot be used as a valid RTT value, since the reason for the disconnection could be, for example, relocation of that ONU. The formula (3) allows the OLT to schedule a GRANT message to a disconnected ONU with unknown R-TT. That is, the formula (3) allows the optical access network 202 to use interleaved schedule when the RTT values for some ONUs are unknown.

The modified formula (3) guarantees that the OLT 204 will not send a GRANT message to a disconnected ONU (with an unknown RTT) until the OLT receives the entire transmission from the previous ONU. Thus, data from a disconnected ONU with a very small RTT that suddenly comes alive will not collide with data from the previously polled ONU. In addition, the OLT will be able to schedule a GRANT message to the next ONU (i.e., keep the pipeline of the OLT full) even if the disconnected ONU remains disconnected. The reason is that since reply from a disconnected ONU can only be received within the timeout interval, the data from the next ONU can safely arrive after the timeout period, regardless of whether the disconnected ONU has come alive or remains disconnected.

An advantage of the optical access network 202 with the interleaved polling scheme is that there is no need to synchronize the ONUs. In addition, there is no need to perform ranging (distance/delay equalization). Furthermore, since the entire scheduling and contention resolution are performed by the OLT 204, the optical access network can easily change the scheduling in real-time based on changes in network conditions. There is no need for the ONUs to negotiate and agree on new parameters, nor do the ONUs need to switch to new settings synchronously because all the ONUs are driven by GRANT messages received from the OLT.

Figure 12:
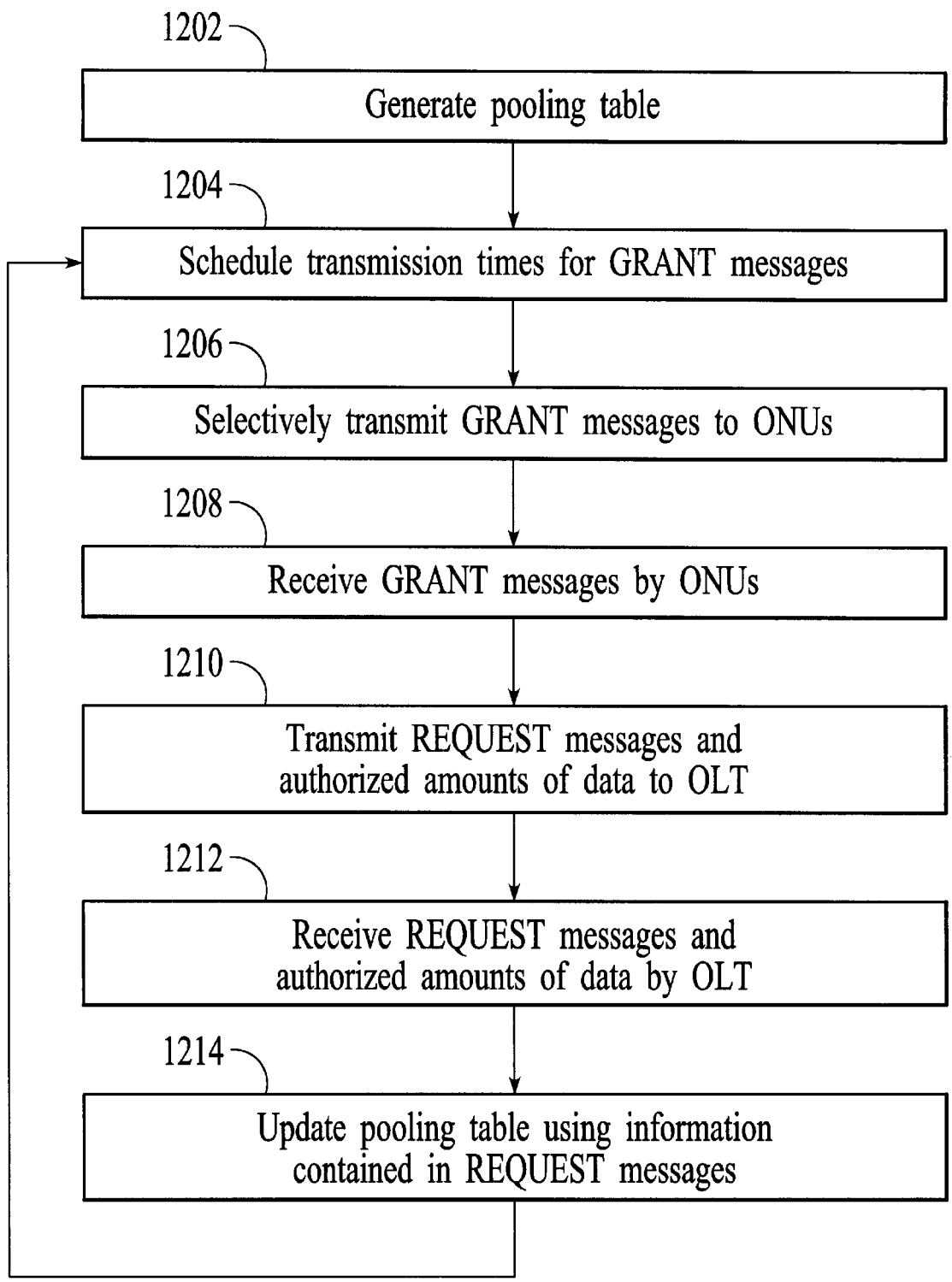
FIG. 12 is a process flow diagram of a method of transmitting optical data in the optical access network in accordance with the present invention.

A method of transmitting optical signals in the optical network access 202 in accordance with the present invention is described with reference to FIG. 12. At step 1202, a polling table is generated by the processor 222 of the OLT 204 in memory 220 using the cold start procedure, as described above with reference to FIG. 11. The polling table includes information about the current sizes of data waiting to be transmitted from the ONUs 206, 208 and 210 to the OLT. At step 1204, transmission times for GRANT messages to be sent are scheduled. Next, at step 1206, the GRANT messages are selectively transmitted to the ONUs in accordance with the scheduled transmission times. Each GRANT message indicates an authorized amount of data that can be transmitted to the OLT from a receiving ONU. The authorized amount is dependent on the information included in the polling table. At step 1208, the GRANT messages are received by the ONUs. In response to the GRANT messages, the receiving ONUs transmit REQUEST messages and the authorized amounts of data that were waiting for transmission at the receiving ONUs, at step 1210. The REQUEST messages include updated information about the current sizes of data waiting to be transmitted at the receiving ONUs. Next, at step 1212, the REQUEST messages and the authorized amounts of data are received by the OLT. At step 1214, the polling table is updated by the processor of the OLT using the updated information contained in the REQUEST messages. After step 1214, the method proceeds to repeat steps 1204–1214 using the updated polling table.

What is claimed is:

1. A method of transmitting data in an optical network comprising:

generating a table that includes information about the current sizes of data waiting to be transmitted from a plurality of remote terminals to a central terminal;

selectively transmitting grant messages to said remote terminals, each grant message being indicative of a permission for a targeted remote terminal to transmit an authorized amount of said data waiting at said targeted remote terminal, said authorized amount being dependent on said information included in said table with regard to said targeted remote terminal;

receiving authorized amounts of said data from said remote terminals in response to said grant messages, including request messages containing updated information about the current sizes of said data waiting to be transmitted at said remote terminals; and updating said table using said updated information contained in said request messages received from said remote terminals.

2. The method of claim 1 wherein said step of updating said table includes subtracting a value from a new entry for said targeted remote terminal, said value corresponding to an actual amount of data transmitted from said targeted remote terminal, said new entry corresponding to said updated information contained in a request message from said targeted remote terminal.

3. The method of claim 1 further comprising a step of scheduling transmission times for said grant messages such that said data and said updated information from said remote terminals do not overlap during transmission, said transmission times for said grant messages substantially defining reception times for said request messages at said central terminal.

4. The method of claim 3 wherein said step of scheduling said transmission times includes scheduling said transmission times such that a grant message to a particular remote terminal is not transmitted before a previous request message from said particular remote terminal is received by said central terminal.

5. The method of claim 3 wherein said step of scheduling said transmission times includes rescheduling an original transmission time for a grant message to a rescheduled transmission time when said original transmission time conflicts with another transmission time for a different grant message.

6. The method of claim 5 wherein said step of rescheduling includes rescheduling said original transmission time for said grant message such that said rescheduled transmission time is after said different grant message has been transmitted.

7. The method of claim 1 further comprising:

detecting a disconnected remote terminal; and reducing the frequency of grant messages that are transmitted to said disconnected remote terminal.

8. The method of claim 7 wherein said step of detecting said disconnected remote terminal includes waiting a predefined period for said disconnected remote terminal to respond to a grant message transmitted to said disconnected remote terminal.

9. The method of claim 1 further comprising a step of embedding said grant messages in between Ethernet frames or within said Ethernet frames, each grant message being embedded after a code of an Ethernet frame that is not used for Ethernet encoding, said code being utilized as an escape code.

10. The method of claim 1 wherein said authorized amount in said step of selectively transmitting said grant messages is less than a predefined maximum amount.

11. The method of claim 1 wherein said optical network is a passive optical network.

12. The method of claim 11 wherein said optical network is an Ethernet-based passive optical network.

13. The method of claim 1 wherein each of said grant messages and said request messages includes an identification code field and a window size field.

14. The method of claim 13 wherein said Window size field of each of said grant messages defines said authorized amount of data permitted to be transmitted by a receiving remote terminal.

15. The method of claim 13 wherein said window size field of each of said request messages defines the current size of data waiting to be transmitted to said central terminal at a transmitting remote terminal.

16. The method of claim 1 wherein said table further includes information about round trip times of data transmission between said central terminal and said remote terminals.

17. The method of claim 16 further comprising:

computing current round trip times for said remote terminals, including monitoring transmission times associated with said grant messages from said central terminal and reception times associated with said authorized amounts of said data from said remote terminals; and updating said information about round trip times of data transmission using computed current round trip times.

18. A method of transmitting optical signals in a point-to-multipoint optical network comprising:
   generating a table that contains entries of the current sizes of data waiting to be transmitted from a plurality of remote terminals to a central terminal;
   transmitting a first grant message from said central terminal to a first remote terminal, said first grant message being indicative of a permission for said first remote terminal to transmit a specific amount of data waiting at said first remote terminal, said specific amount being dependent on an entry included in said table for said first remote terminal;
   receiving said specific amount of said data from said first remote terminal at said central terminal in response to said first grant message, including a first request message containing updated information about the current size of said data waiting at said first remote terminal when said first request message was sent; and
   updating said table using said updated information contained in said first request message received from said first remote terminal.

19. The method of claim 18 further comprising:
   transmitting a second grant message from said central terminal to a second remote terminal;
   receiving an authorized amount of said data from said second remote terminal at said central terminal, including a second request message containing updated information about the current size of said data waiting at said second remote terminal when said second request message was sent;
   updating said table using said updated information contained in said second request message received from said second remote terminal.

20. The method of claim 19 further comprising a step of scheduling transmission times for said first and second grant messages such that said data and said first request message from said first remote terminal do not collide with said data and said second request message from said second remote terminal during transmission, said transmission times for said first and second grant messages substantially defining reception times for said first request message and said second request message at said central terminal.

21. The method of claim 20 wherein said step of scheduling said transmission times includes scheduling said transmission times such that said first grant message to said first remote terminal is not transmitted before a previous request message from said first remote terminal is received by said central terminal.

22. The method of claim 20 wherein said step of scheduling said transmission times includes rescheduling an original transmission time for said first grant message to a rescheduled transmission time when said original transmission time conflicts with another transmission time for a different grant message.

23. The method of claim 22 wherein said step of rescheduling includes rescheduling said original transmission time for said first grant message such that said rescheduled transmission time is after said different grant message has been transmitted.

24. The method of claim 18 further comprising;
   detecting a disconnected remote terminal; and
   reducing the frequency of grant messages that are transmitted to said disconnected remote terminal.

25. The method of claim 24 wherein said step of detecting said disconnected remote terminal includes waiting a predefined period for said disconnected remote terminal to respond to a grant message transmitted to said disconnected remote terminal.

26. The method of claim 18 wherein said step of updating said table includes subtracting a value from a new entry for said first remote terminal, said value corresponding to an actual amount of data transmitted from said first remote terminal, said new entry corresponding to said updated information contained in said first request message from said first remote terminal.

27. The method of claim 18 further comprising a step of embedding said first grant message in between Ethernet frames or within one of said Ethernet frames, said first grant message being embedded after a code of an Ethernet frame that is not used for Ethernet encoding, said code being utilized as an escape code.

28. The method of claim 18 wherein said specific amount in said step of transmitting said first grant message is less than a predefined maximum amount.

29. The method of claim 18 wherein said point-to-multipoint optical network is an Ethernet-based passive optical network.

30. The method of claim 18 wherein said table further includes information about round trip times of data transmission between said central terminal and said remote terminals.

31. The method of claim 30 further comprising:
   computing a current round trip time for said first remote terminal, including monitoring a transmission time associated with said first grant message from said central terminal and a reception time associated with said specific amount of said data from said first remote terminal; and
   updating said information about round trip times of data transmission for said first remote terminal using a computed current round trip time.

32. A point-to-multipoint optical network comprising:
   a plurality of remote terminals that receive and transmit optical data, each remote terminal configured to transmit a request message and an authorized amount of data waiting at said remote terminal in response to a grant message received by said remote terminal, said request message including updated information about the current size of data waiting at said remote terminal, said grant message including information that indicates said authorized amount; and
   a central terminal optically coupled to said remote terminals to transmit and receive said optical data, said central terminal comprising:
      memory that includes a table containing latest information about the current sizes of data waiting to be transmitted from said remote terminals to said central terminal; and
      a processor that is configured to selectively transmit grant messages to said remote terminals using said latest information contained in said table to indicate authorized amounts of data that can be sent by receiving remote terminals, said processor further configured to receive request messages from said remote terminals in response to said grant messages and to update said table in said memory using said updated information contained in said request messages.

33. The network of claim 32 wherein said processor of said central terminal is configured to update said table in said memory by subtracting values from new entries for selected remote terminals that have transmitted said request messages to said central terminal, said values corresponding to actual amounts of data transmitted from said selected remote terminals, said new entries corresponding to said updated information contained in said request messages.

34. The network of claim 32 wherein said processor of said central terminal is further configured to schedule transmission times for said grant messages such that said data and said request messages from said remote terminals do not overlap during transmission, said transmission times for said grant messages substantially defining reception times for said request messages at said central terminal.

35. The network of claim 34 wherein said processor of said central terminal is further configured to schedule transmission times for said grant messages such that a specific grant message for a particular remote terminal is not transmitted before a previous request message from said particular remote terminal is received by said central terminal.

36. The network of claim 34 wherein said processor of said central terminal is further configured to reschedule an original transmission time for a specific grant message to a rescheduled transmission time when said original transmission time conflicts with another transmission time for a different grant message.

37. The network of claim 32 wherein said processor of said central terminal is configured to detect disconnected remote terminals by identifying said remote terminals that have not responded to said grant messages within a timeout period.

38. The network of claim 37 wherein said processor of said central terminal is configured to reduce the frequency of grant messages that are transmitted to said disconnected remote terminals.

39. The network of claim 32 wherein said processor of said central terminal is configured to embed said grant messages in between Ethernet frames or within said Ethernet frames, each grant message being embedded after a code of an Ethernet frame that is not used for Ethernet encoding, said code being utilizes as an escape code.

40. The network of claim. 32 wherein said processor of said central terminal is configured to generates said grant messages such that said authorized amounts of data that can be sent by said receiving remote terminals are less than a predefined maximum amount.

41. The network of claim 32 wherein said point-to-multipoint optical network is an Ethernet-based passive optical network.

42. The network of claim 32 wherein said table included in said memory further includes information about round trip times of data transmission between said central terminal and said remote terminals.

43. The network of claim 42 wherein said processor is configured to compute current round trip times for said remote terminals by monitoring transmission times associated with grant messages from said central terminal and reception times associated with request messages from said remote terminals and to update said information about round trip times using computed current round trip times.

* * * * *